United States Patent Office 2,701,030
Patented Feb. 1, 1955

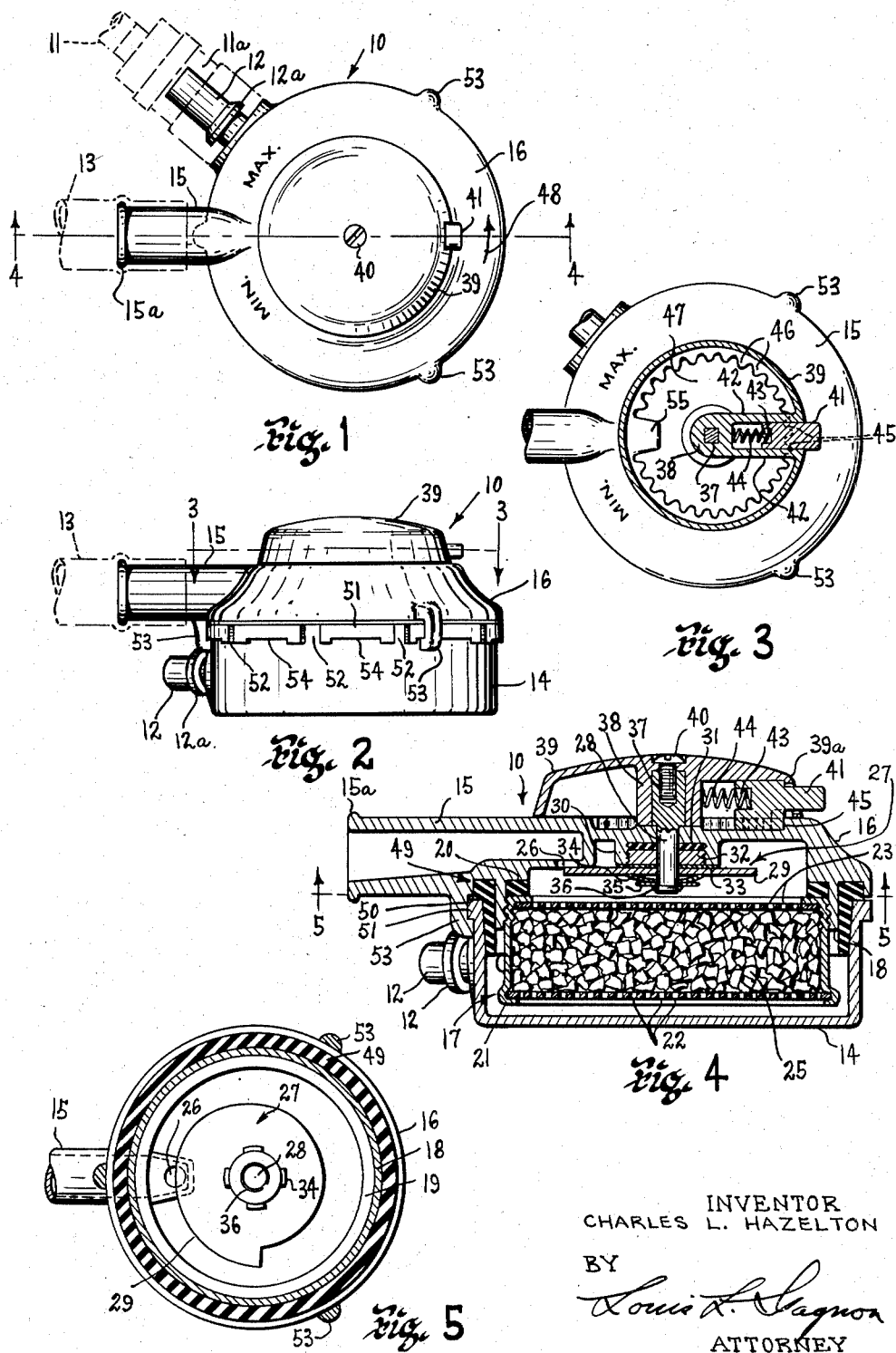

2,701,030

AIR LINE FILTER

Charles L. Hazelton, North Woodstock, Conn., assignor to American Optical Company, Southbridge, Mass., a voluntary association of Massachusetts Application July 5, 1951, Serial No. 235,323

9 Claims. (Cl. 183—39)

This invention relates to filtering devices and has particular reference to a simple, efficient and novel filter unit adapted primarily for use with air line respirators through which air is supplied under pressure to said respirators.

It is desirable when air is supplied under pressure to a respirator that filtering means be used in the air line between the air supply device and the respirator for filtering impurities therefrom such as solid particles of foreign matter, vapors or fluids, and also valve means for controlling the flow of air through the air line to the respirator.

Therefore, it is a primary object of this invention to provide a combined filtering device and valve for use in air lines in which air is supplied under pressure to a respirator or the like.

Another object is to provide a combined filtering device and valve of the above character so constructed and arranged as to withstand the application thereto of air under moderately high pressure without disconnection of the parts of the device or interference with the efficient function thereof.

Another object is to provide a device of the above character wherein the intake and outlet ports can be adjustably located with respect to one another as desired, either diametrically opposed or at any desired angle.

Another object is the provision of improved valve means for a device of the above character which is simple in construction, efficient in operation, and readily and easily adjustable in use.

Other objects and advantages of this invention will become apparent from the following description taken in connection with the accompanying drawing in which;

Fig. 1 is a top plan view of a device embodying the invention;

Fig. 2 is a side elevational view of the device shown in Fig. 1;

Fig. 3 is a fragmentary horizontal sectional view taken on line 3—3 of Fig. 2 looking in the direction of the arrows;

Fig. 4 is a vertical sectional view taken on line 4—4 of Fig. 1 looking in the direction of the arrows; and Fig. 5 is a reduced horizontal sectional view taken on line 5—5 of Fig. 4 looking in the direction of the arrows.

Referring more particularly to the drawings wherein like characters of reference designate like parts throughout the several views, the invention is embodied in a filtering device 10 preferably formed of aluminum or other light weight metal. The device 10 is adapted to be attached to the ends of two lengths of hose, the first hose 11 (Fig. 1) extending from the filter 10 to an air supply plant (not shown) such as a compressor. The hose 11 is connected to the filter 10 by a coupling 11a which is fitted over the end of a tubular extension 12 leading into the interior of the lower portion 14 of the filter housing. The other hose 13 is attached at one end to a tubular portion 15 of the upper portion 16 of the filter housing and has its other end attached to a face mask, respirator or the like (not shown). To insure secure attachment of the hose 11, the tubular extension 12 is provided with flanges 12a at or near its end with which the coupling 11a is adapted to interlock. The extension 15 is also provided with a flange 15a over which the hose 13 tightly fits.

In using the device air is supplied from a supply source via hose 11 to the filter 10 and passes through the filter 10 and out through hose 13 to the face mask. In order to properly purify the air as it passes through the filter 10, the lower portion 14 thereof is shaped to freely receive a filter cartridge 17 which is carried by an annular portion 18 of the upper portion 16 of the housing. The annular portion 18 is internally threaded and the filter cartridge 17 is secured thereto and threaded tightly against a rubber or similar resilient gasket 19 which is positioned between the peripheral edge of the filter cartridge 17 and an annular ledge 20 formed on the inner surface of the housing portion 16 (Fig. 4).

The filter cartridge 17 preferably comprises a canister 21 having opposed inlet and outlet openings 22 and 23 respectively in its sides for permitting air to pass therethrough, the air stream being indicated by the arrows in Fig. 4. A clearance is provided around the filter cartridge 17 between the canister 21 and walls of the housing portion 14 so that air entering through opening 24 from the hose 11 will freely travel toward the inlet openings 22 through which it will enter the canister 21. As the air passes through the canister 21 it is purified by means such as a supply 25 of activated charcoal or other purifying media selected in accordance with the conditions under which the device is to be used. The purifying media can be prevented from passing out of the canister 21 through the openings 22 or 23 by suitable means in the nature of a foraminous material such as fabric, screen or the like (not shown).

Purified air thus flows from the canister 21 through openings 23 into the interior of the upper portion 16 of the housing from which it passes through an opening 26 into the tubular portion 15 and thence into the hose 13.

In accordance with this invention valve means is provided for controlling the amount of air flowing into the hose 13 and embodies a valve plate 27 which is fixedly carried at one end of a shaft 28 rotatably mounted in the upper portion 16 of the housing. The valve plate 27 is provided with a cam-like edge surface 29, as shown in Fig. 5, whereby the peripheral portion of the plate adjacent the cam surface will cover an increasingly greater portion of the opening 26 as it is rotated in a counterclockwise direction.

An annular protruding portion 30 is provided on the inner surface of the upper portion 16 of the housing and is internally threaded for reception of a rubber air seal 31 and a bushing 32 (Fig. 4), the ring 30, seal 31 and bushing 32 encircling the shaft 28 with the seal 31 preventing leakage of air therearound. A flat washer 33 is disposed between the valve plate 27 and edge of the annular protruding portion 30 and a spring washer 34 is mounted over the adjacent end of the shaft 28 and serves, through the retaining action of a flat washer 35 and ring 36, to urge the valve plate 27 against the areas of the upper portion 16 of the housing encircling the opening 26 whereby a more efficient control of the airflow through the opening 26 is provided.

The other end of the shaft 28 extends outwardly of the upper portion 16 of the housing and is provided with a rectangular shaped portion 37 which is adapted to fit within a comating recess in a boss 38 formed on the inner surface of a hollow knob 39 and secured therein as by a screw 40. Thus as the knob 39 is manually rotated the shaft 28 and valve plate 27 will also rotate whereby the valve plate 27 will control the flow of air through the opening 26.

Means is also provided for yieldably restraining the knob 39 from undesired movement out of adjusted position and comprises a slidable key 41 which is positioned within the knob 39 between a pair of radially extending parallel guides 42. One end of the key 41 extends outwardly of the knob 39 through an opening or notch 39a provided therefor and the lower side thereof is formed with teeth 45 which are adapted to mesh with teeth 46 formed on the periphery of a shallow recess 47 provided in the outer surface of the upper portion 16 of the housing. A coiled spring 44 is positioned between the boss 38 and the key 41, having one end located within a recess 43 in the key 41, and serves to constantly urge the key 41 outwardly to maintain the teeth 45 and 46 in meshed relation.

To operate the device for adjusting the flow of air from the filter to the respirator, the operator will merely depress the key 41 to space the teeth 45 and 46 and rotate the knob to the desired position. Means such as an arrow 48 provided on the upper portion 16 of the housing may be used to designate the direction of rotation of the knob 39 to increase the flow of air to the respirator. The bottom of the shallow recess 47 in the housing portion 16 is built up slightly as shown in Fig. 3 to form a raised portion 55 at a point immediately above the opening 26. The raised portion 55 forms a stop against which the key 41 abuts when the knob 39 is rotated to the extreme limits of its travel as indicated by the designations "MAX" and "MIN" on the housing portion 16.

Novel means is also provided for attaching the upper and lower portions 16 and 14 of the housing together and preventing flow of air therebetween and comprises an annular gasket 49 (Fig. 4) carried by the upper portion 16 which is adapted to be positioned within the circular wall of the lower portion 14 when attaching the portions together. The gasket 49 is provided with a shelf-like portion 50 against which the edge of the lower portion is adapted to be seated. The depending portion 50a of the gasket 49 extends below the adjacent annular portion 18 of the housing portion 16. Thus air pressure built up within the housing will cause the depending portion 50a to be forcefully pressed against the inner wall of the chamber in the lower housing portion 14 to further aid in providing an efficient air seal. The outer surface of the lower portion 14 is provided with a peripheral flange 51 (Fig. 2) adjacent its upper edge which is notched at intervals as indicated by numeral 52. A plurality of downwardly extending hooks 53 carried by the upper portion 16 are adapted to be positioned within the notches 52 in assembling the portions 14 and 16, and by forcefully pressing the portions 14 and 16 together sufficiently to compress the portion 50 of the gasket 49 and by then slightly rotating said portions relative to each other, the hooks 53 can be slid beneath the flange 51 and into recesses 54 formed on the lower side thereof. Such a construction prevents accidental separation of the parts of the housing with consequent possible disaster to the user of the device. Forceful compression of the gasket 49 is necessary to again disengage the portions 14 and 16 of the housing. The inner surface of the wall of the housing portion 14 may be tapered slightly if desired to provide greater ease of assembly.

From the foregoing description it is apparent that all of the objects and advantages of this invention have been accomplished through the provision of a novel filter device for air supply systems and embodying a control valve for controlling the flow of air through the system. It will be apparent, however, that many changes may be made in the details of construction and arrangement of parts shown and described without departing from the spirit of the invention as expressed in the accompanying claims. Therefore, it is to be understood that all matter set forth or shown in the accompanying drawings is to be interpreted as illustrative and not in a limiting sense.

I claim:

1. A device of the character described comprising a housing having a first and a second portion connected together, filtering means carried within said housing, inlet means for air into said housing, outlet means for air from said housing after purification thereof by said filtering means, and valve means associated with said outlet means for regulating the flow of air therethrough, said valve means comprising a plate-like closure member mounted in one of said portions for rotation about an axis spaced from the opening of said outlet means and having a side surface thereof located in intimate overlying relation with said opening of the outlet means, said closure member being in the shape of a cam having radii progressively increasing from less than the distance separating the remotest point of the opening of said outlet means from the axis of rotation of the closure member to nearly said distance to permit said closure member to be rotated into progressively increasing and decreasing closing relation with said outlet means whereby air will be permitted to pass therethrough in accordance with the area of said opening of the outlet means being covered by said closure member, and control means carried externally by one of said portions and connected with said closure member for manually rotating said closure member into desired adjusted relation with said outlet means.

2. A device of the character described comprising a housing having a first portion shaped to have a chamber therein and a second portion shaped to form a cover for said first portion and adapted to be connected in air sealed relation therewith, filtering means carried by said second portion and suspended freely within said chamber in said first portion when said portions are in assembled relation, inlet means in said first portion for air into said chamber and through said filtering means, outlet means in said second portion for filtered air from said housing, and valve means carried by said second portion and associated with said outlet means for regulating the flow of air therethrough, said valve means comprising a closure member mounted in said second portion between said filtering means and said outlet means about an axis spaced from the opening of said outlet means and having a side surface thereof positioned in intimate overlying relation with said opening of the outlet means, said closure member being in the form of a cam having radii progressively increasing from less than the distance separating the remotest point of said opening from the axis about which the closure member rotates to nearly said distance whereby it may be rotated into progressively increasing and decreasing closing relation with said outlet means to regulate air permitted to pass therethrough in accordance with the area of said opening of the outlet means being covered by said closure member, and control means carried externally by one of said portions and connected with said closure member for manually rotating said closure member into desired adjusted relation with said outlet means.

3. An device of the character described comprising a housing having a first portion shaped to have a chamber therein and a second portion shaped to form a cover for said first portion and adapted to be connected in air sealed relation therewith, filtering means carried by said second portion and suspended freely within said chamber in said first portion when said portions are in assembled relation, inlet means in said first portion for air into said chamber and through said filtering means comprising a tubular member provided externally on said first portion and having an opening communicating with said chamber, outlet means in said second portion for filtered air from said housing comprising a tubular member provided externally on said second portion and having a port for communication with the interior of said second portion, and valve means carried by said second portion and associated with said port for regulating the flow of air therethrough, said valve means comprising a cam-shaped closure member mounted in said second portion between said filtering means and said port and having a side surface thereof positioned in intimate overlying relation with said port, said closure member being adapted to be rotated into progressively increasing and decreasing closing relation with said port whereby air will be permitted to pass therethrough in accordance with the area of said port being covered by said closure member, control means carried externally by one of said portions and connected with said closure member for manually rotating said closure member into desired adjusted relation with said port, and yieldable interlocking means carried by said control means and the portion of the housing on which said control means is disposed for arresting said closure member in different positions of adjustment.

4. An air line filtering device comprising a first and second portion connected together to form a housing, filtering means carried within said housing, an inlet on said device having means connectable with an air line for air into the housing and an outlet on said device having means connectable with a second air line for air from said housing after purification thereof by the filtering means, a closure member located internally of the housing and operably connected with a control member located externally of the device on one of said portions, said closure member being adjustable by movement of the control member to bring a portion of the closure member into progressively increasing and decreasing closing relation with said outlet to vary the size of opening in said outlet, said closure member being arranged to prevent complete closing of said opening whereby some air may always flow therethrough, and spring-pressed means carried by the control member and engaging portions of the housing on which said control member is located for releasably arresting movement of the control member whereby the closure member may be set at desired positions of adjustment to regulate the flow of air through the device.

5. A device of the character described comprising a housing having a first and a second portion detachably connected together, filtering means carried within said housing, inlet means for air into said housing, outlet means for air from said housing after purification thereof by said filtering means, and valve means associated with said outlet means for regulating the flow of air therethrough, said valve means comprising a cam-shaped closure member mounted in one of said portions and positioned with a side surface thereof located in intimate overlying relation with said outlet means, said closure member being adapted to be rotated into progressively increasing and decreasing closing relation with said outlet means whereby air will be permitted to pass therethrough in accordance with the area of said outlet means being covered by said closure member, and control means carried externally by one of said portions and connected with said closure member for manually rotating said closure member into desired adjusted relation with said outlet means and ratchet means and embodying a reciprocating member carried by said control means for movement therewith and engagement means carried by said housing for interlocking engagement with said reciprocating member for retaining said valve means in adjusted position, and operating means for moving said reciprocating member out of engagement with said engagement means whereby said valve may be moved to the desired adjusted position.

6. A device of the character described comprising a housing having a first portion and a second portion adapted to be connected together, said portions each being shaped to have a chamber therein, filtering means carried by one of said portions and suspended freely within the chamber in the other of said portions when said portions are in assembled relation, and connection means for removably retaining said portions in connected relation and embodying a compressible gasket between said portions, a peripheral flange formed on one of said portions having parts thereof notched at intervals throughout its length and having recesses on its lower side intermediate said removed parts, and hooked members formed on the other of said portions and adapted to be extended through said notched parts of the flange and positioned in engagement with the recesses on the lower side of the flange intermediate the notched parts by pressure and rotation of one portion relative to the other to connect the two portions together, and the engagement of said hooked members with the recesses preventing accidental separation of said portions.

7. A device of the character described comprising a housing having a first portion and a second portion adapted to be connected together, said portions each being shaped to have a chamber therein, filtering means carried internally of said portions, and connection means for removably retaining said portions in connected relation embodying a peripheral flange formed on one of said portions and having portions thereof notched at intervals throughout its length, said flange having recesses formed in its surface directed away from the opposed portion of said housing, and hooked members formed on said opposed portion of the housing and adapted to be extended through said notched portions of the flange and interlocked with said recesses on pressure and rotation of one portion relative to the other, the interlocking of the hooked members with the recesses preventing accidental separation of said portions of the housing.

8. A device of the character described comprising a housing having a first portion and a second portion adapted to be connected together, said portions each being shaped to have a chamber therein, filtering means carried by one of said portions and suspended freely within the chamber in the other of said portions when said portions are in assembled relation, and connection means for removably retaining said portions in connected relation and embodying a notched peripheral flange formed on one of said portions, and means on the other of said portions adapted to be extended through said notched flange and positioned in engagement with the remote side of the flange whereby said portions are prevented from moving in a direction away from one another and means for preventing leakage of air between said assembled portions of the housing comprising a resilient annular gasket including a shelf-like part positioned between the adjacent edges of the two portions of the housing and an angled part adapted to lie in intimate relation with the inner wall of one portion of the housing, said angled part being moved into overlying relation with the separation between said portions under the pressure of air within the housing to seal the same.

9. A device of the character described comprising a housing having a first portion and a second portion adapted to be connected together, said portions each being shaped to have a chamber therein, the first portion having an annular wall extending from the top thereof into the chamber in the second portion when said portions are in assembled relation, filtering means secured to the inner side of said annular wall, connection means for removably retaining the two portions of the housing in connected relation, and means for preventing leakage of air between said assembled portions of the housing comprising an annular gasket having a lip fitting between the adjacent edges of the two portions when assembled and having an angled resilient apron fitting in intimate relation with the inner wall of the second portion of the housing and the outer surface of said annular wall extending from the top of the first portion whereby upon presence of air under pressure within said housing said apron will be moved into overlying relation with the separation between said portions of the housing and seal the same.

References Cited in the file of this patent

UNITED STATES PATENTS

| | | |
|---|---|---|
| 1,459,588 | Hoffman | June 19, 1923 |
| 1,955,354 | Winslow | Apr. 17, 1934 |
| 2,015,772 | Wassall | Oct. 1, 1935 |
| 2,295,296 | Schmidt | Sept. 8, 1942 |
| 2,400,719 | Stackhouse | May 21, 1946 |
| 2,506,313 | Mueller | May 2, 1950 |

FOREIGN PATENTS

| | | |
|---|---|---|
| 621,932 | France | Feb. 14, 1927 |